United States Patent

[11] 3,622,598

| [72] | Inventor | James L. Willis<br>Borger, Tex. |
|---|---|---|
| [21] | Appl. No. | 595,902 |
| [22] | Filed | Nov. 21, 1966 |
| [45] | Patented | Nov. 23, 1971 |
| [73] | Assignee | Phillips Petroleum Company |

[54] PRODUCTION OF SULFOLANE
8 Claims, 1 Drawing Fig.

[52] U.S. Cl............................................... 260/332.1,
23/121, 23/122
[51] Int. Cl................................................ C07d 63/04,
C01d 5/00, C01f 11/46
[50] Field of Search.................................... 260/332.1

[56] References Cited
UNITED STATES PATENTS

| 2,402,891 | 6/1946 | Hooker et al. ............... | 260/329 |
| 2,451,298 | 10/1948 | Morris et al. ................ | 260/329 |
| 3,152,144 | 10/1964 | Middlebrook................ | 260/332.1 |

*Primary Examiner*—John D. Randolph
*Assistant Examiner*—Cecilia M. Shurko
*Attorney*—Young and Quigg ABSTRACT: A sulfolane compound is prepared by reacting sulfur dioxide with an unsaturated organic compound containing two or more ethylenic linkages, in the absence of a solvent, to produce a molten sulfolene compound, introducing the molten sulfolene compound into a suitable hydrogenation solvent, pulling a vacuum on the resulting solution to remove a portion of the sulfur dioxide contained therein, adding hydrogen peroxide to the solution to convert any remaining sulfur dioxide to sulfur trioxide, adding aqueous caustic to the thus treated solution to convert the sulfur trioxide to a sulfate salt to substantially prevent the prolonged existence of sulfuric acid, filtering the solution to remove any insoluble salts and/or polymer, and subjecting the filtrate to hydrogenation conditions to convert the sulfolene compound to the corresponding sulfolane compound.

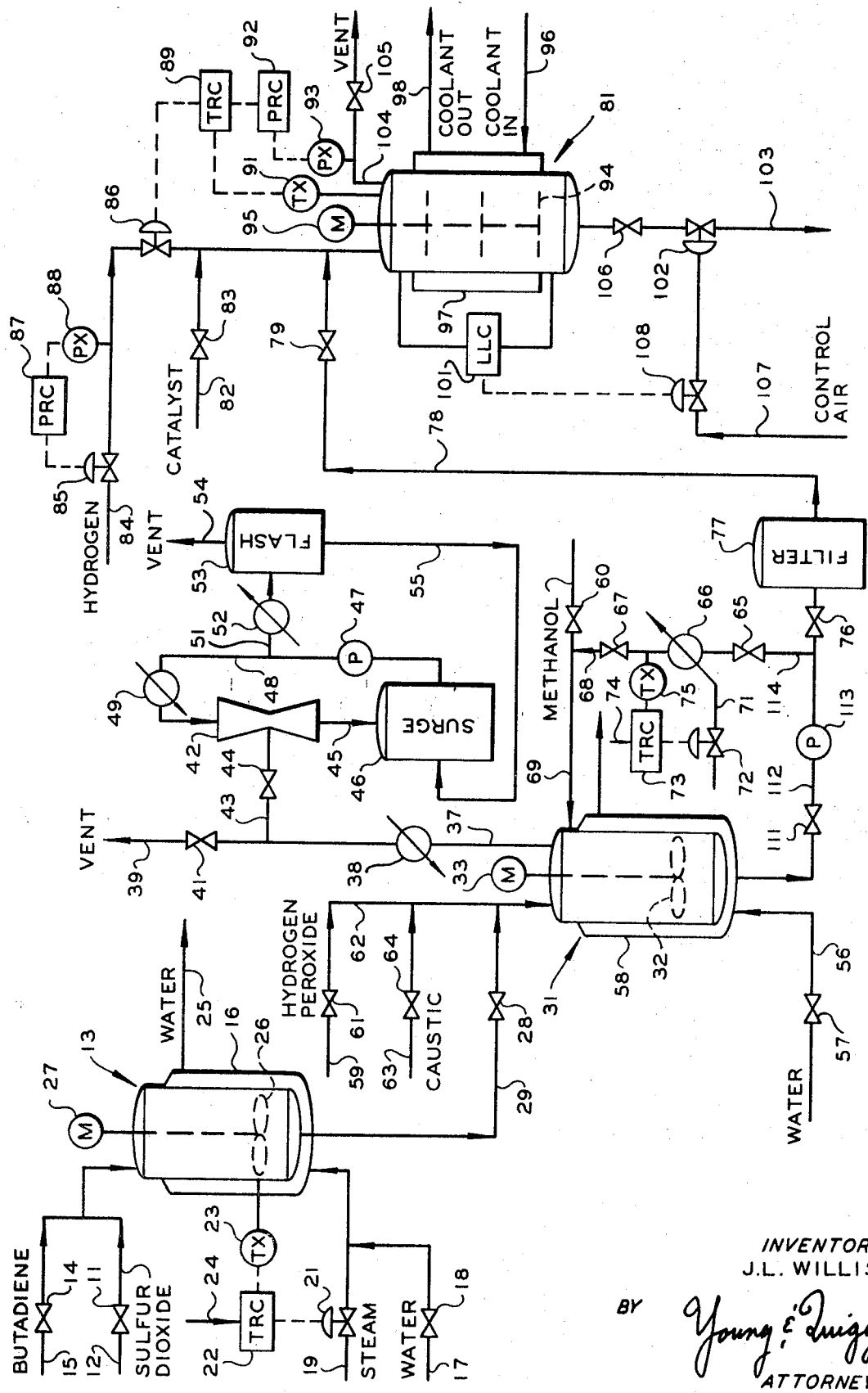

PRODUCTION OF SULFOLANE

In prior processes it has been proposed that the sulfur dioxide and unsaturated organic compound be reacted either in the presence of or absence of a suitable solvent. However, processes utilizing a solvent in the reaction experienced a considerable reduction in the conversion and the processes which did not utilize a solvent faced significant problems in crystallizing the sulfolene compound to permit removal of sulfur dioxide. It has also been proposed that hydrogen peroxide be added to a solution of the sulfolene compound to convert the excess sulfur dioxide to sulfur trioxide. However, some corrosion difficulties have been encountered in that sulfuric acid can also result from this reaction, and dilute sulfuric acid forms in the presence of water. This dilute acid is very corrosive to the apparatus.

Accordingly, it is an object of this invention to provide an improved process for the production of a sulfolane compound. It is an object of the invention to minimize corrosion problems in a sulfolane process. Another object of the invention is to provide maximum conversion of sulfur dioxide and unsaturated organic compound to a sulfolene compound while eliminating difficulties in the conversion of the sulfolene compound to the corresponding sulfolane compounds. Another object of the invention is to remove excess sulfur dioxide from a sulfolene product. Yet another object of the invention is to convert any sulfur dioxide in a sulfolene product to another compound which will not interfere with hydrogenation of the sulfolene product to a sulfolane product and which will not present problems of corrosion.

Other objects, aspects and advantages of the invention will be apparent to one skilled in the art from a study of the disclosure, the drawing and the appended claims to the invention.

The term "a sulfolene" as employed herein and in the appended claims defines generically the unsubstituted and substituted unsaturated compounds comprising or containing a sulfolene nucleus, i.e. a five-membered ring of four carbon atoms and a sulfur atom with a single olefinic linkage between two adjacent carbon atoms of said ring, and two oxygen atoms each of which is directly attached to said sulfur atom. Thus the generic term "a sulfolene" covers the simple unsubstituted sulfolenes, viz, the 3-sulfolene having the general structure

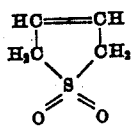

and the 2-sulfolene having the structure

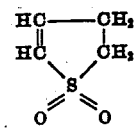

as well as the various substituted derivatives thereof, i.e. sulfolene compounds in which various organic and/or inorganic and particularly hydrocarbon radicals, i.e. alkyl, alkenyl, aryl, aralkyl, alkaryl, alicyclic and/or heterocyclic radicals, and/or such inorganic radicals as do not interfere with the hydrogenation reaction, are substituted for one or more of the hydrogen atoms of the above structures of the unsubstituted sulfolenes. In general the sulfolene molecule will contain a total of from four to 12 carbon atoms.

Similarly, the term "sulfolane" as employed herein and in appended claims refers to a saturated sulfolene compound which may be either unsubstituted or substituted. In other words, the sulfolane compound contains or consists of a saturated five-membered ring of four carbon atoms and a sulfur atom, the latter having two oxygen atoms directly attached thereto. The structural formula of the simple unsubstituted sulfolane, therefore, is

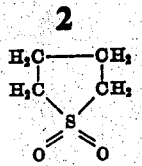

The generic term "a sulfolane" or "a sulfolane compound" covers not only the above compound but also the substituted derivatives thereof, particularly those in which various radicals mentioned in the preceding paragraphs are substituted for one or more of the hydrogen atoms of the above structure. Where such a radical is hydrogenatable under the conditions of the present process, it will be understood that the sulfolane containing the hydrogenated radical is included when reference is made to a sulfolane compound which "corresponds" to a given sulfolene compound. Thus, an alkyl sulfolane, such as a propyl or butyl sulfolane, corresponds to the alkenyl, such as allyl or butenyl respectively, sulfolene.

The material known as sulfolane, i.e. 2,3,4,5-tetrahydrothiophene-1,1-dioxide, has found valuable uses as an intermediate in the production of other useful organic chemicals, and as a selective solvent for hydrocarbons of various types, fatty acids or fatty acid esters, and the like. Various derivatives thereof have also been likewise employed, particularly 2,4-dimethyl sulfolane, which has been used as a selective solvent to separate aromatic hydrocarbons from petroleum fractions.

The sulfolene compounds can be prepared by reacting sulfur dioxide with at least one sulfolene precursor compound having the structural formula:

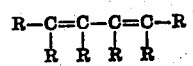

wherein each R is selected from the group consisting of hydrogen and various organic and/or inorganic radicals which do not interfere with the reaction to produce the sulfolene compound or the subsequent hydrogenation reaction to produce the corresponding sulfolane compound. Inorganic radicals which are suitable include the halogens, hydroxyl groups, and the like. A presently preferred class of starting materials comprises the conjugated diolefins of the structural formula indicated where each R is individually selected from the group consisting of hydrogen, alkyl, alkenyl, aryl, cycloalkyl and cycloalkenyl and combinations thereof such as aralkyl, alkaryl and alkylcycloalkyl, where the total carbon content of the molecule is in the range of 4 to 12. Representative examples of the unsaturated organic compound include 1,3-butadiene, 2-methyl-1,3-butadiene (isoprene), 1,3-pentadiene (piperylene), 2,3-dimethyl-1,3-butadiene, 2,3-diethyl-1,3-butadiene, 2,3-di-tertiary-butyl-1,3-butadiene, 2-tertiary-butyl-1,3-butadiene, 3,4-dimethyl-2,4-hexadiene, 3,4-diethyl-2,4-hexadiene, 2,4-dodecadiene, 2-methyl-1,3-pentadiene, 2-methyl-1,3-hexadiene, 2,4-dimethyl-2,4-hexadienee, 4-ethyl-1,3-hexadiene, 2-cyclopentyl-1,3-butadiene, 1-cyclopentyl-1,3-pentadiene, 1-cyclohexyl-1,3-butadiene, 1-(1-cyclohexen-1-yl)-1,3-butadiene, 2-phenyl-1,3-butadiene, 3-benzyl-1,3-pentadiene, 2-benzyl-1,3-butadiene, 3-p-tolyl-1,3-pentadiene, 2-m-tolyl-1,3-butadiene, and the like and their homologues and analogues. Also, suitable substituted derivatives of the above and like polyolefins may be reacted with sulfur dioxide to form the desired mono-sulfones, examples of such substituted polyolefins being 2-chloro-1,3-butadiene, 2-methyl-3-chloro-1,3-butadiene, 1-cyano-1,3-butadiene, and the like.

Referring now to the drawing, there is illustrated a diagrammatic representation of a process in accordance with one embodiment of the invention.

For the sake of simplicity, the process will be described in terms of a batch process for the production of 2,3,4,5-tetrahydrothiophene 1,1-dioxide (known as sulfolane) from 1,3-butadiene and sulfur dioxide. Valve 11 in line 12 is opened to pass sulfur dioxide from a suitable source thereof into batch reactor 13. Valve 14 in line 15 is opened to pass 1,3-butadiene from a suitable source thereto into reactor 13. The butadiene and sulfur dioxide are reacted in reactor 13 in the absence of a solvent. The sulfur dioxide to butadiene mol ratio will generally be in the range of about 1:1 to about 1.6:1. While any suitable reaction temperature and pressure can be employed, the temperature in reactor 13 will generally be in the range of from about 100° F. to about 300° F., while the pressure in reactor 13 will generally be in the range of about 100 p.s.i.g. to about 600 p.s.i.g. In a presently preferred embodiment the sulfur dioxide is charged to reactor 13 at a temperature of approximately 140° F. After the sulfur dioxide is charged, the butadiene is added and the reactor temperature is permitted to rise slowly from the initiation temperature of about 140° F. to about 200° F. during the butadiene addition. After the butadiene addition is completed, the reactor contents are maintained at approximately 200° F. for a suitable time to permit substantial completion of the reaction. The temperature of reactor 13 is regulated by means of a heating jacket 16. Water is passed through line 17 and valve 18 into an inlet of jacket 16 while steam is injected into jacket 16 by way of line 19 containing valve 21. The valve 21 can be regulated by temperature recorder controller 22 responsive to a comparison of the actual temperature of the reactor contents as indicated by temperature sensor transmitter 23 and the desired setpoint valve 24. The water is withdrawn from heating jacket 16 by way of conduit 25. Agitation of the contents of reactor 13 can be provided by suitable means, such as stirrer 26 driven by motor 27. Suitable polymerization inhibitors, which can be added to reactor 13 separately or admixed with the butadiene, include pyrogallol, tert-butyl pyrocatechol, phenyl-**-naphthylamine, and the like. The amount of the inhibitor will generally be in the range of from about 0.02 to about 1.0 weight percent based on the butadiene.

Upon the desired completion of the reaction, valve 28 in conduit 29 is opened to pass the molten reaction effluent from reactor 13 into treating vessel 31 which already contains a suitable hydrogenation solvent. Examples of such solvents include water, aqueous alkalies, alcohols such as methanol, ethanol, isopropanol, normal propanol, sulfolane, and admixtures of these solvents, and the like. In the process illustrated in the drawing, methanol is utilized. Additional methanol can then be added to vessel 31 through conduits 60 and 69. Agitation of the methanol and molten sulfolene can be provided by a suitable means, such as stirrer 32 driven by motor 33. The amount of solvent utilized is sufficient to provide a fluid solution and will generally be in the range of weight ratio of solvent to sulfolene of about 1:20 to 1:1. A vacuum is pulled on the methanol sulfolene solution to remove a major portion of the excess sulfur dioxide contained in the reaction effluent from reactor 13. One suitable system for pulling such vacuum is illustrated in the drawing, wherein conduit 37 provides communication between the upper portion of vessel 31 and the inlet of a condenser 38. The outlet of condenser 38 can be vented to the atmosphere through conduit 39 and valve 41 to flare any unreacted sulfur dioxide and/or butadiene, after which the outlet of condenser 38 can be connected to the first inlet of aspirator 42 by way of conduit 43 and valve 44. Sulfolane is introduced into the second inlet of aspirator 42 to cause withdrawal of sulfur dioxide and some methanol vapors from vessel 31 into the aspirator 42. The sulfolane containing the sulfur dioxide and methanol is passed from aspirator 42 by way of conduit 45 into a surge tank 46, from which it is withdrawn by pump 47 and passed through conduit 48 and cooler 49 back to the second inlet of aspirator 42. A portion of the sulfolane containing sulfur dioxide and methanol passes from conduit 48 through conduit 51 and heater 52 into flash tank 53. The sulfur dioxide and methanol vapors are vented from flash tank 53 by conduit 54. These vapors can be recovered for reuse, if desired, The flashed sulfolane passes from flash tank 53 through conduit 55 to surge tank 46. Hot water can be passed through conduit 56 containing valve 57 into and through heating jacket 58 surrounding vessel 31 to heat the fluid contents of vessel 31 and thus increase the amount of sulfur dioxide driven out of the solution.

The temperature and pressure in tank 31 during the vacuum heating operation will generally be in the range of from about 75° F. to about 150° F. and about 5 p.s.i.a. to about 50 mm. Hg absolute. In a presently preferred embodiment the temperature of the solution in vessel 31 is maintained in the range of about 100° F. to about 120° F. at a pressure in the range of from about 100 to about 150 mm. Hg absolute during the vacuum treatment. The vacuum treatment will generally reduce the sulfur dioxide concentration in vessel 31 to less than 0.1 weight percent.

After the vacuum treatment is concluded, additional methanol can be introduced into vessel 31 through conduits 60 and 69 as desired. Hydrogen peroxide is introduced into vessel 31 by way of conduit 59, valve 61 and conduit 62 to oxidize any remaining sulfur dioxide to sulfur trioxide, an excess of hydrogen peroxide being preferred for this purpose. The weight ratio of hydrogen peroxide (100 percent $H_2O_2$ basis) to sulfur dioxide will generally be in the range of about 0.5 to about 0.7. In general the hydrogen peroxide can be utilized in aqueous solution with the $H_2O_2$ concentration ranging from 1 to 50 weight percent. In order to neutralize the produced sulfuric acid, aqueous caustic solution is introduced into vessel 31 by way of conduit 63 and valve 64 after the introduction and reaction of the hydrogen peroxide.

While any suitable caustic, such as sodium hydroxide, potassium hydroxide, and the like, can be utilized, aqueous sodium hydroxide of about 5 to 60 weight percent NaOH is presently preferred. The mol. ratio of NaOH (100 percent NaOH) to sulfur trioxide utilized will generally be about (100 percent NaOH) to sulfur trioxide will generally be about 2:1 to neutralize sulfuric acid produced from the treatment of the remaining sulfur dioxide.

A portion of the fluid contents of vessel 31 can be withdrawn therefrom during any or all of the venting, vacuum treating, hydrogen peroxide addition and caustic addition and passed through valve 111, conduit 112, pump 113, conduit 114, and valve 65 into and through indirect heat exchanger 66 wherein the fluid is heated. The thus heated fluid passes through valve 67 and conduits 68 and 69 into the upper portion of vessel 31. The external heating circuit also provides greater agitation and admixing of the fluid components. The flow rate of the heat exchange fluid in conduit 71 can be regulated by valve 72 responsive to a comparison by temperature recorder controller 73 of the desired temperature setpoint 74 with the actual temperature of the fluid in conduit 68 as indicated by temperature sensor-transmitter 75.

After the neutralization is completed, the fluid contents of vessel 31 are withdrawn by way of valve 111, conduit 112, and passed by pump 113 through valve 76 into and through filter 77 to remove any polymer which may have formed. The filtered solution of the sulfolene compound in aqueous methanol is then passed through conduit 78 and valve 79 into hydrogenation reactor 81. A suitable hydrogenation catalyst is introduced into reactor 81 by way of conduit 82 and valve 83. Suitable catalysts include any of those known in the art to be useful in the catalytic hydrogenation of sulfolenes to sulfolanes. A preferred class of hydrogenation catalysts are those which comprise the metal hydrogenation catalysts, such as those containing or consisting of nickel, cobalt, copper, platinum, palladium or mixtures of these metals with themselves or with other metals such as iron, zinc, chromium, cadmium, etc. These metals may be used in finely divided form such as, for example, Raney nickel, or may be suitably supported on a support such as kieselguhr, aluminum oxide, diatomaceous earth, and the like. These catalysts can be prepared in any suitable manner, and a discussion of such preparation will be omitted in the interest of brevity. The amount of catalyst utilized will vary with the catalyst but will generally be in the range of about 1 to about 5 weight percent based on the sulfolene charged.

Hydrogen is introduced into reactor 81 by way of conduit 84 and valves 85 and 86. Valve 85 can be manipulated by pressure recorder controller 87 to maintain the hydrogen pressure in conduit 84 downstream of valve 85, as indicated by pressure sensor-transmitter 88, substantially constant. The amount of hydrogen utilized is sufficient to provide the desired hydrogenation pressure and will generally be in the range of about 10 p.s.i.g. to about 2,000 p.s.i.g., preferably 50 p.s.i.g. to 500 p.s.i.g.

The reaction temperatures and pressures can vary over wide ranges. In fact any temperature is operable at which the reaction mixture is liquid, and which is below that at which the materials decompose. In order to avoid any substantial thermal decomposiiton, I prefer to operate below about 125° F., preferably in the range from about 50° to 120° F. Hydrogenation proceeds at hydrogen pressure above 5 pounds per square inch gauge and is effected quite rapidly and smoothly at 500 and 1,500 pounds per square inch gauge. Pressures above this range can be employed if desired.

As the hydrogenation reaction is exothermic, valve 86 in conduit 84 can be manipulated by temperature recorder controller 89 responsive to a comparison of a desired temperature setpoint and the actual temperature in reactor 81, as indicated by temperature sensor-transmitter 91, to maintain the temperature in reactor 81 within a desired range. The pressure in reactor 81 can be maintained in the desired range by utilizing pressure recorder controller 92 to manipulate the temperature setpoint of controller 89 responsive to the pressure in reactor 81 as indicated by pressure sensor-transmitter 93. Agitation of the fluid contents of reactor 81 can be provided by stirrer 94 driven by motor 95. A coolant can be passed through conduit 96 into and through jacket 97 to aid in maintaining the temperature in reactor 81 in the desired range. Used coolant is removed through conduit 98.

Following completion of the hydrogenation reaction, the sulfolane product can be recovered by conventional procedures. Generally this comprises first cooling the reaction mixture, venting gases therefrom, filtering the cooled reaction mixture to remove catalyst, and fractionating the filtered reaction mixture to remove solvent and unreacted sulfolene.

Liquid level controller 101 actuates control of valve 108 located in the fluid actuating conduit 107 which passes control fluid to valve 102 in outlet conduit 103. Valve 106 is opened to remove the batch of hydrogenated material from reactor 81 upon completion of the reaction therein. In order to insure that the reactor outlet 103 is not accidentally left open during filling with the next batch, the level controller 101 senses the low level in reactor 81 and overrides the control fluid actuating valve 108 to close valve 102 in conduit 103.

Also, vent valve 105 in conduit 104 can be used to vent reactor 81.

The following example is presented in further illustration of the invention and should not be construed to unduly limit the invention.

EXAMPLE

The process illustrated in the drawing is operated under the following conditions to produce sulfolane.

Reactor (16):

| | | |
|---|---|---|
| Initial temperature, °F. | 140 | |
| Final temperature, °F. | 200 | |
| Pressure range, p.s.i.g. | 300 to 100 | |
| Time cycle, hours | | |
| Charge SO₂ | 1 | |
| Heat to 140° F. | 1 | |
| Charge butadiene. | 4 | |
| Retain at 200° F. | 1 | |
| Discharge to neutralization | 1 | |
| Total time, hours | 8 | |
| Materials, pounds: | IN | OUT |
| Sulfur dioxide (12) | 1,620 | |
| Butadiene* (15) | 1,123 | |
| Crude Sulfolene (29) | | 2,605 |
| Losses (5%) | | 138 |
| *Contains about 0.05 wt. % tert-butylpyrocatechol | | |

Neutralizer (31):
| | | |
|---|---|---|
| Initial Temperature, °F. | 100 | |
| Final Temperature, °F. | 110 | |

(a) Crude sulfolene (29) at 200° F. is dumped into neutralizer (31) containing methanol at 100° F., and flared at atmospheric pressure. Then a vacuum is effected to 100 mm. Hg absolute to remove unreacted SO₂ and butadiene.

| | | |
|---|---|---|
| Time cycle, hours | | |
| Filling (see above) | (1) | |
| Flaring operation | 2 | |
| Vacuum operation | 1 | |
| Analyze for SO₂ | 2 | |
| Addition of H₂O₂ and NaOH | 1 | |
| Filtering | 1 | |
| Preparing for next batch | 1 | |
| Total | 8 (9) | |
| Materials, pounds: | IN | OUT |
| Crude Sulfolene (29) | 2,605 | |
| Methanol | 2,605 | |
| Hydrogen peroxide (30%) | 10 | |
| Sodium HYDROXIDE (48° Be') | 15 | |
| Sulfolene-Methanol | | 4,325 |
| Losses: | | |
| Methanol | | 500 |
| SO₂ | | 288 |
| Sulfolene (decomposed) | | 167 |

Hydrogenation (81):

| | | |
|---|---|---|
| Temperature, °F. | 100 | |
| Pressure, p.s.i.g. | 200 | |
| Time cycle, hours | | |
| Charging (see above) | 1 | |
| Hydrogenating | 6 | |
| Filtering (not shown) | 1 | |
| Materials, pounds: | IN | OUT |
| Sulfolene-Methanol (78) | 4,325 | |
| Raney nickel (82) | 48 | |
| Hydrogen (b) (84) | 454 | |
| Hydrogen (a) (104) (vented) | | 421 |
| Sulfolene (c) (103) | | 215 |
| Methanol (103) (c) | | 2,150 |
| Sulfonate (c) (103) | | 1,968 |
| losses (catalyst and heavies) (103) | | 73 |

(a) Excess hydrogen
(b) Impure hydrogen containing inerts such as methane can be used
(c) This product is treated by filtration and fractionation, not shown, to recover product sulfolane Reasonable variations and modifications are possible within the scope of this disclosure without departing from the spirit and scope thereof.

I claim:

1. A process for the production of a sulfolane compound which comprises contacting sulfur dioxide with a sulfolene precursor compound in the absence of a solvent under suitable reaction conditions to cause the production of a molten sulfolene compound, said sulfolene precursor having the structural formula:

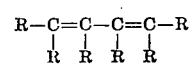

where each R is individually selected from the group consisting of hydrogen and organic and inorganic radicals which do not interfere with the reaction to produce the sulfolene compound or the hydrogenation of the sulfolene compound to the corresponding sulfolane compound, contacting the resulting molten reaction effluent with a suitable solvent therefor, said solvent also being suitable as the solvent for the hydrogenation of the sulfolene compound to the corresponding sulfolane compound, subjecting the resulting solution to a partial vacuum to remove at least a portion of any unreacted sulfur dioxide contained in said solution, adding hydrogen peroxide to the partially vacuum stripped solution to convert any remaining sulfur dioxide to sulfur trioxide, adding a suitable caustic to the thus treated solution to convert the sulfur trioxide and any sulfuric acid present to the corresponding salt, contacting the thus treated solution with hydrogen in the presence of a suitable hydrogenation catalyst under hydrogenation conditions to convert the sulfolene compound in the solution to the corresponding sulfolane compound.

2. A process in accordance with claim 1 wherein each of said R is individually selected from the group consisting of hydrogen, alkyl, alkenyl, aryl, aralkyl, alkaryl and alicyclic radicals with the total carbon content of said precursor compound being in the range of 4 to 12.

3. A process in accordance with claim 2 wherein said sulfur dioxide and said sulfolene precursor compound are contacted at a temperature in the range of about 100° F. to 300° F. at a pressure in the range of about 100 p.s.i.g. to about 600 p.s.i.g., the sulfur dioxide to precursor compound mol ratio being in the range of about 1:1 to about 1.6:1.

4. A process in accordance with claim 3 wherein said solvent is selected from the group consisting of water, aqueous alkalies, methanol, ethanol, normal propanol, isopropanol, sulfolane, and admixtures thereof.

5. A process in accordance with claim 4 wherein said partial vacuum is at a pressure in the range of about 5 p.s.i.a. to about 55 mm. Hg absolute at a temperature in the range of about 75° F. to about 150° F.

6. A process in accordance with claim 5 wherein a major portion of the unreacted sulfur dioxide contained in said molten reaction effluent is removed by the partial vacuum treatment, and the hydrogen peroxide is then added to the vacuum stripped solution in a weight ratio of hydrogen peroxide (100 per cent $H_2O_2$ basis) to remaining sulfur dioxide in the range of about 0.5 to about 0.7.

7. A process in accordance with claim 6 wherein said caustic is added in an amount sufficient to react with substantially all of the sulfur trioxide present.

8. A process in accordance with claim 7 wherein the caustic treated solution is filtered to remove any polymer prior to the contacting of the caustic treated solution with hydrogen in the presence of the hydrogenation catalyst.

* * * * *